Sept. 1, 1942. E. E. HEWITT 2,294,601
LOCOMOTIVE BRAKE EQUIPMENT
Filed Dec. 31, 1940 4 Sheets-Sheet 2
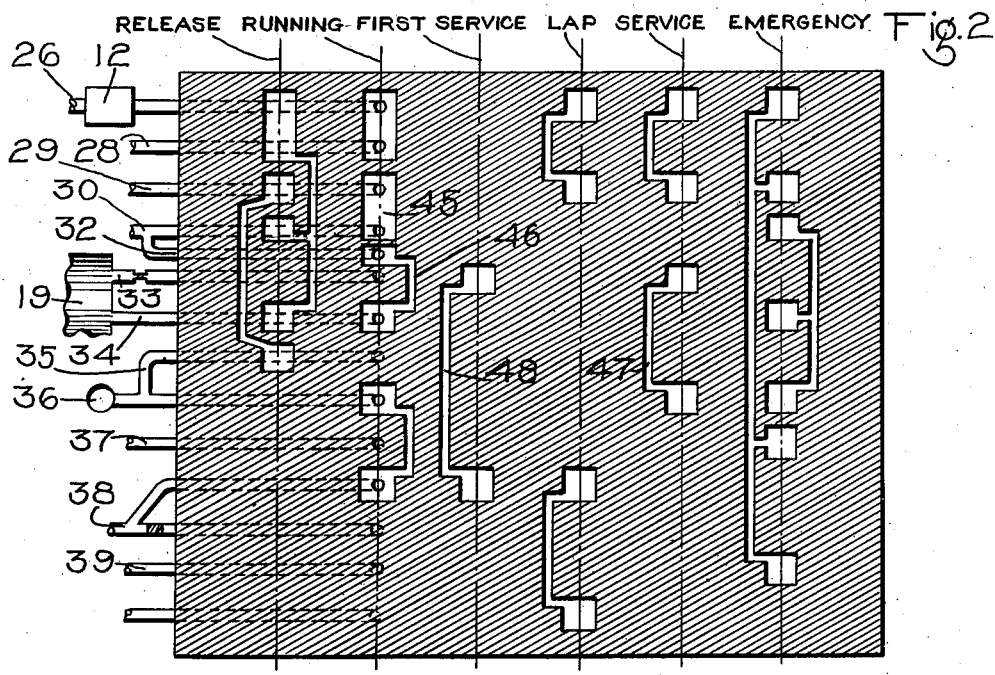
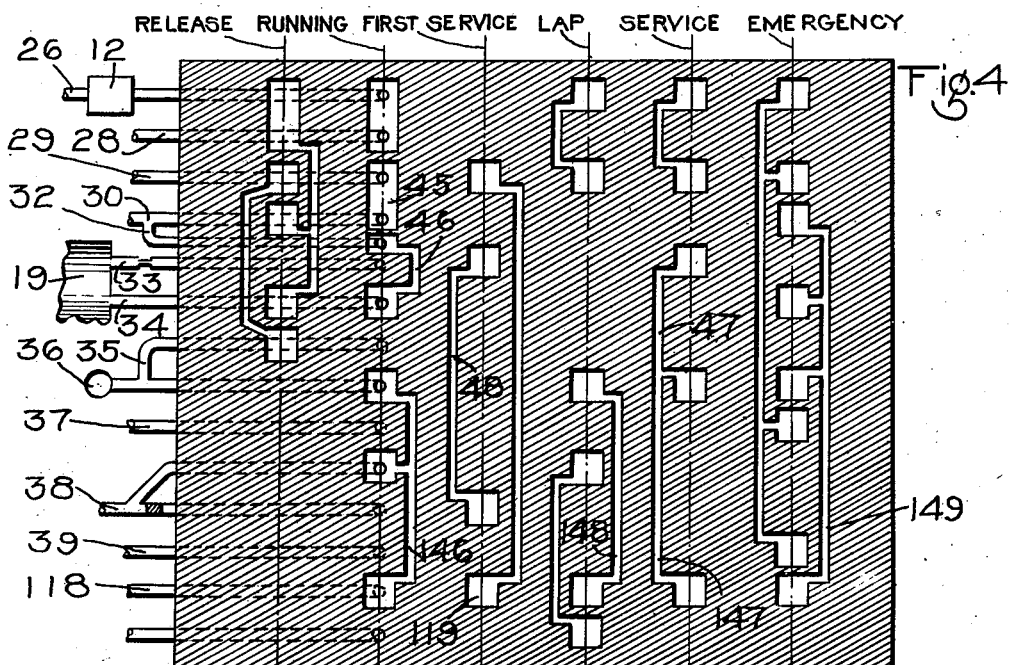
INVENTOR
ELLIS E. HEWITT
BY *J. M. Higgins*
ATTORNEY

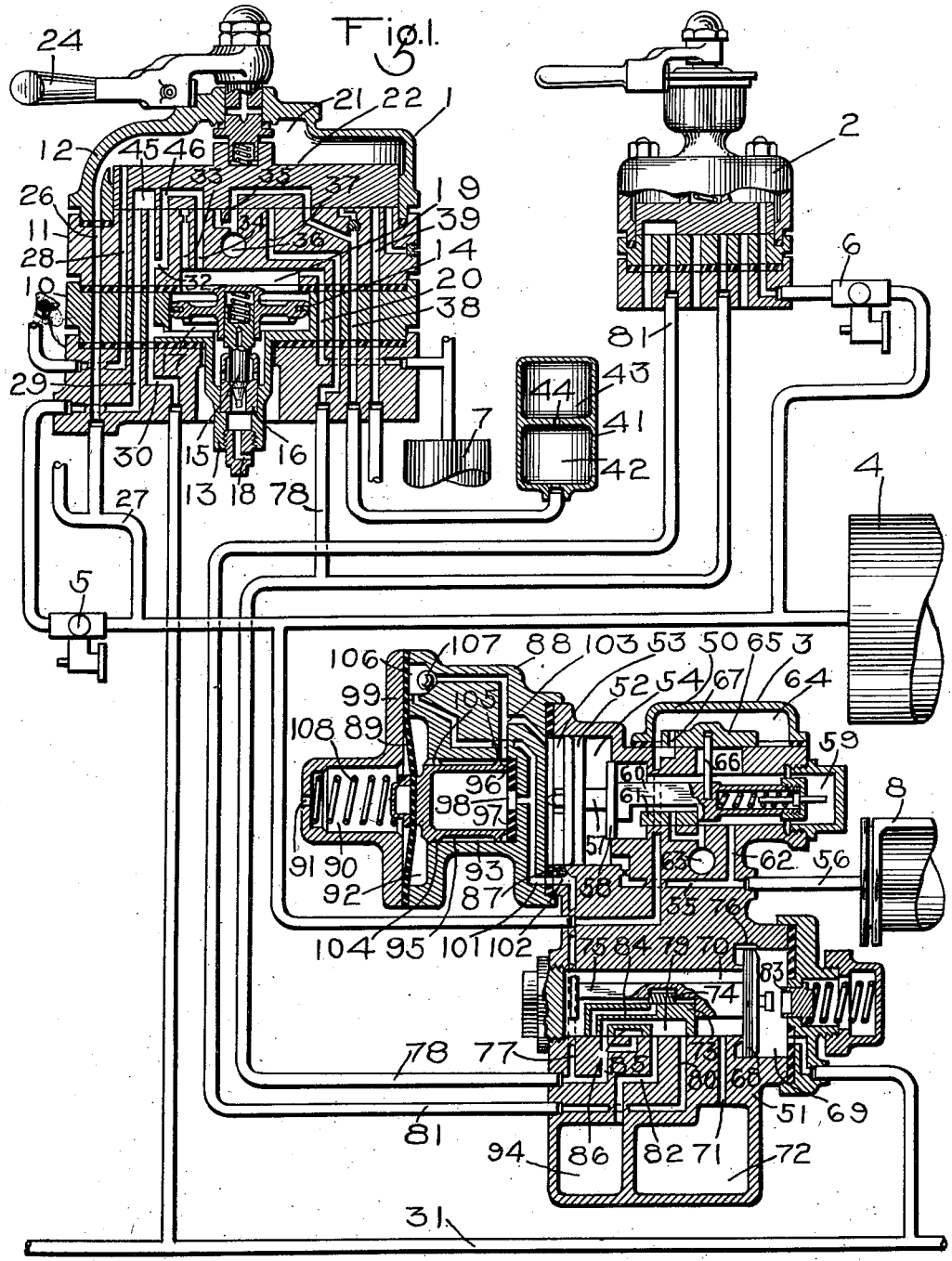

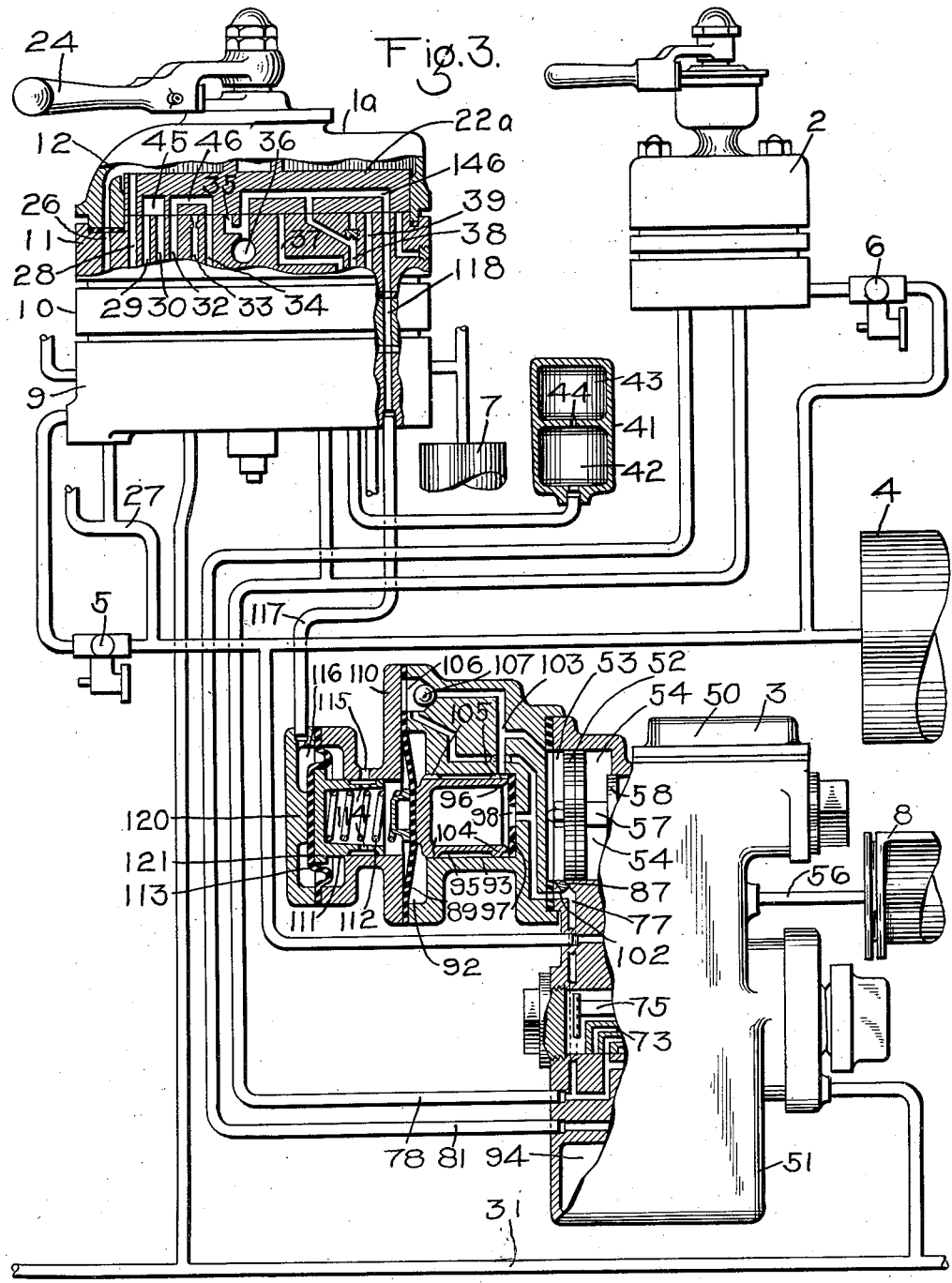

Sept. 1, 1942. E. E. HEWITT 2,294,601
LOCOMOTIVE BRAKE EQUIPMENT
Filed Dec. 31, 1940  4 Sheets-Sheet 4
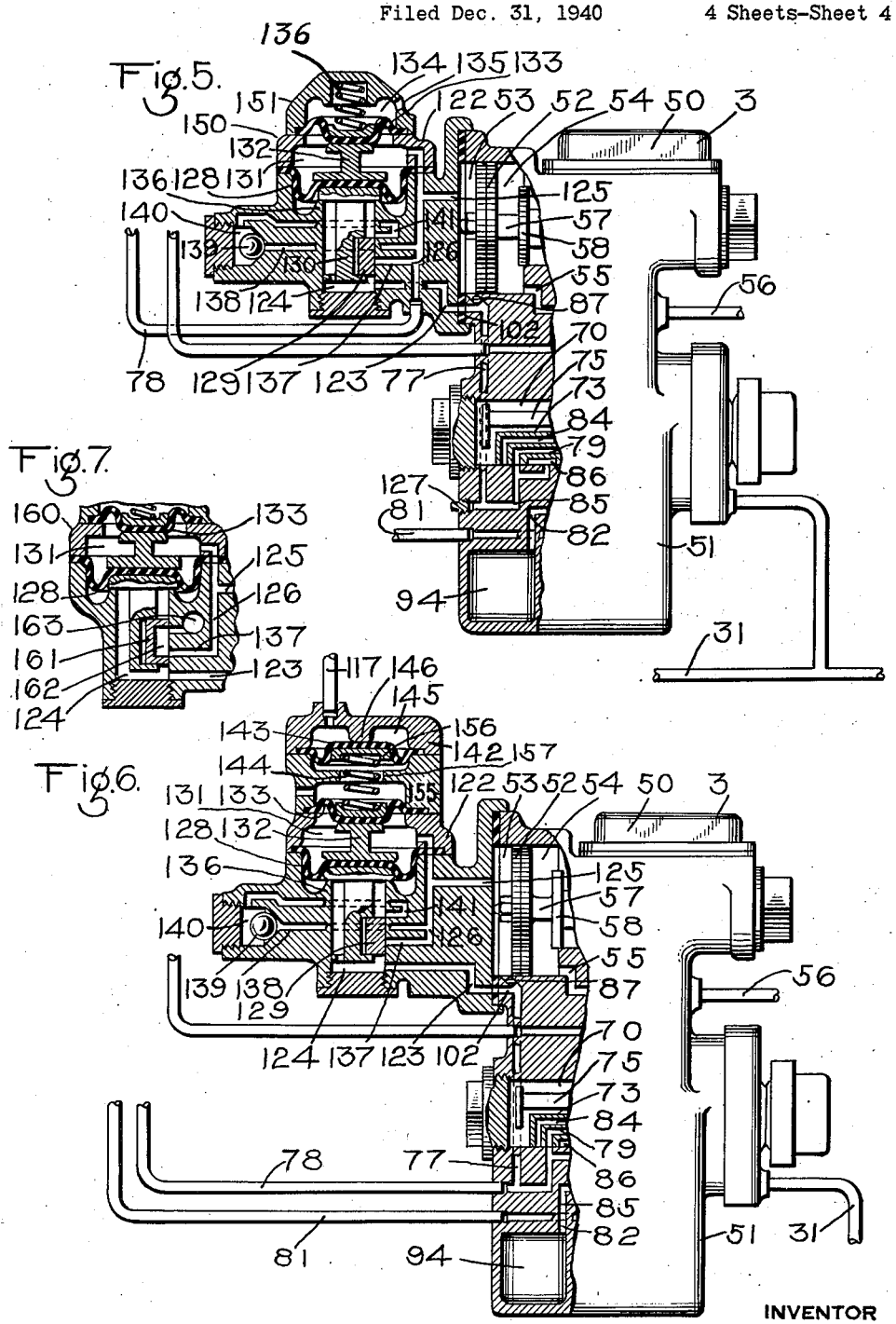
INVENTOR
ELLIS E. HEWITT
BY
ATTORNEY Patented Sept. 1, 1942

2,294,601

UNITED STATES PATENT OFFICE 2,294,601

LOCOMOTIVE BRAKE EQUIPMENT

Ellis E. Hewitt, Edgewood, Pa., assignor to The Westinghouse Air Brake Company, Wilmerding, Pa., a corporation of Pennsylvania Application December 31, 1940, Serial No. 372,456

24 Claims. (Cl. 303—40)

This invention relates to fluid pressure brake equipment and more particularly to the type used on locomotives for controlling the brakes on a locomotive and cars of a train.

In an automatic fluid pressure brake system the brakes on a train are applied by operating the engineer's automatic brake valve device on the locomotive to effect a reduction in brake pipe pressure. Since the brake pipe reduction is effected initially at the head of the train, the brakes on the train apply serially toward the rear end thereof. As a result of this serial brake action, the front end of the train tends to decelerate ahead of the rear end and thus cause a gathering or running in of the slack in the train. Under certain operating conditions, and particularly in long trains, this running in of slack may cause excessive shocks and possible damage to parts of the train.

One object of the invention is the provision of improved means for delaying the application of the brakes on the locomotive of a train so that the inertia of the locomotive, which tends to keep the slack in the train stretched out, may be effective to retard the gathering of slack due to an application of brakes on the cars of the train.

Another object of the invention is the provision of an improved locomotive brake equipment embodying an engineer's automatic brake valve device having a first service position for effecting a light, limited application of brakes on the cars of a train and further embodying means for holding off the locomotive brakes in said brake valve position to thereby render the inertia of the locomotive effective to retard the gathering of the slack in the train by the light application of car brakes.

Another object of the invention is the provision of an improved locomotive brake equipment embodying an engineer's automatic brake valve device having in addition to the usual service position, a first service position for effecting a light, limited reduction in brake pipe pressure to cause a light slack gathering application of brakes on the cars of a train and also embodying means operative in said first service position to hold the locomotive brakes released so that the inertia of the locomotive will be effective to retard the gathering of slack in the train.

Another object of the invention is to provide improved means adapted to be associated with the usual distributing valve device of the well known No. 6–ET locomotive brake equipment for delaying the application of locomotive brakes upon a reduction in brake pipe pressure.

Still another object of the invention is the provision of improved delay valve means adapted to be removably applied to the distributing valve device of the No. 6–ET locomotive brake equipment, in place of the usual cover over the application cylinder thereof, for delaying the operation of the application portion of said device to apply the brakes on the locomotive upon a reduction in brake pipe pressure.

A still further object of the invention is the provision of an improved locomotive brake equipment comprising a distributing valve device modified as just described and an engineer's automatic brake valve device of a No. 6–ET locomotive brake equipment also modified to provide a first service position in place of the usual holding position for effecting a light, limited reduction in brake pipe pressure and thereby a light application of brakes on the cars of the train for gathering train slack and for at the same time delaying the application of brakes on the locomotive, so that the inertia of the locomotive will be effective to retard the gathering of train slack so as to thereby avoid the development of damaging shocks in the train.

Other objects and advantages will appear from the following more detailed description of the invention.

In the accompanying drawings; Fig. 1 is a diagrammatic view, mainly in section, of a portion of a No. 6–ET locomotive brake equipment embodying one form of the invention; Fig. 2 is a diagrammatic, development view of the rotary valve and seat of the automatic brake valve device shown in Fig. 1; Fig. 3 is a view similar to Fig. 1 disclosing a modified form of the invention; Fig. 4 is a diagrammatic development view of the rotary valve and seat of the automatic brake valve device shown in Fig. 3; Fig. 5 is a diagrammatic view, partly in sectional and partly in outline of a locomotive brake equipment embodying still another form of the invention; Fig. 6 is a view similar to Fig. 5 and disclosing a modification thereof, and Fig. 7 is a sectional view of a modification of the invention shown in Figs. 5 and 6.

General description

The benefits of the present invention may be obtained by slight modifications of or certain additions to the well known No. 6–ET locomotive brake equipment which has been standard on American railroads for years, and which is shown and described in The Westinghouse Air Brake Company's Instruction Pamphlet No. 5032, dated November, 1932, and entitled, No. 6-ET Locomotive Brake Equipment. For these reasons only those parts of the No. 6-ET locomotive brake equipment are shown in the drawings which are pertinent to the invention and the following description of said parts will therefore be limited except as deemed essential to a clear understanding of the invention.

*Description—Fig. 1*

The locomotive brake equipment shown in Fig. 1 comprises an engineer's automatic brake valve device 1, an independent brake valve device 2, a distributing valve device 3, a main reservoir 4, a feed valve device 5, a reducing valve device 6, an equalizing reservoir 7, and a brake cylinder device 8. All of these parts are the same as those of the No. 6-ET locomotive brake equipment except the automatic brake valve device 1 which is slightly modified, and the distributing valve device 3 to which is added a delay valve device, all of which will be hereinafter brought out.

The automatic brake valve device 1 comprises three casing sections 9, 10 and 11 mounted one on top of the other and a cover 12 mounted on the casing section 11, said sections and cover being rigidly secured together in the relation shown in the usual manner.

The intermediate casing section 10 has on its lower face a boss 13 extending downwardly through a suitable central opening provided in the lower casing section 9 which constitutes a pipe bracket for the brake valve device. An equalizing piston 14 is slidably mounted in a suitable bore in casing section 10 and is operatively connected to a brake pipe discharge valve 15 which is slidably mounted in a bore in a bushing 16 secured in the depending boss 13, said valve being adapted to be opened and closed by said piston for controlling communication between a chamber 17 at the lower face of said piston and an exhaust port 18 leading to the atmosphere. At the opposite face of piston 14 is a chamber 19 which is connected through a passage and pipe 20 to the equalizing reservoir 7.

The cover section 12 has a chamber 21 containing a rotary valve 22 which is mounted to turn on a seat provided on the adjacent end face of the casing section 11. The rotary valve 22 has the usual release, running, lap, service, and emergency brake controlling positions, as indicated in Fig. 2, and is rotatable to said positions by a handle 24. In Fig. 1 the rotary valve and handle are both shown in their normal or running positions.

The brake valve casing is provided with the following passages; main reservoir passage 26 connecting pipe 27 from the main reservoir 4 to the rotary valve chamber 21; passage 28 through which the usual steam compressor governor (not shown) is controlled; feed valve passage 29; brake pipe passage 30 connected to a brake pipe 31 and to the equalizing piston chamber 17; passage 32 connected to the brake pipe passage 30; preliminary exhaust passage 33 and passage 34 both of which are open to the equalizing piston chamber 19; warning port 35; atmospheric exhaust port 36; application cylinder pipe passage 37; distributing valve release pipe passage 38; and sanding passage 39.

In running position of the brake valve device shown in Fig. 1, a cavity 45 in the rotary valve connects the feed valve passage 29 to the brake pipe passage 30 which permits flow of fluid under pressure from the feed valve device 5 to the equalizing piston chamber 17 and to the brake pipe 31 for charging same. A cavity 46 in the rotary valve connects passage 32 to passage 34 whereby fluid at feed valve pressure supplied to the brake pipe passage 30 may flow to equalizing piston chamber 19 and through passage and pipe 20 to equalizing reservoir 7 for charging said chamber and reservoir. When the brake pipe 31 and equalizing reservoir 7 are thus both charged with fluid at feed valve pressure, the equalizing discharge valve piston 14 is in equilibrium as to opposing fluid pressures and acts in the usual manner to hold the discharge valve 15 seated.

In the usual service position of rotary valve 22, a cavity in the rotary valve indicated by reference numeral 47 in Fig. 2 is adapted to connect the preliminary exhaust passage 33 to the atmospheric exhaust passage 36 and through this communication fluid is adapted to be vented from the equalizing reservoir 7 at the usual service rate for reducing the pressure in the equalizing piston chamber 19. To limit the degree of such reduction in pressure in the equalizing piston chamber 19 the rotary valve 22 may be turned to lap position for closing communication between said chamber and equalizing reservoir and the atmospheric exhaust port 36.

When the equalizing reservoir pressure in equalizing piston chamber 19 is thus reduced, brake pipe pressure acting in chamber 17 on the opposite face of piston 14 is adapted to raise said piston for thereby opening the discharge valve 15 so as to permit fluid under pressure to be vented from the brake pipe 31 through the exhaust port 18 to the atmosphere. This venting of fluid under pressure from the brake pipe will continue until the brake pipe pressure acting in chamber 17 is reduced to a degree slightly below the reduced equalizing reservoir pressure in chamber 19 at which time the equalizing piston 14 will operate to close the discharge valve 15 to thereby limit the reduction in brake pipe pressure to substantially the same degree as the equalizing reservoir pressure is reduced. This operation of the brake valve device is well understood by those skilled in the art.

The passage 38, heretofore connected to the usual distributing valve release pipe through the independent brake valve device in the well known No. 6-ET locomotive brake equipment is in accordance with the present invention disconnected from the independent brake valve device and connected to a reduction limiting reservoir 41 which is provided with two reduction chambers 42 and 43 communicating with each other through a choke 44. Also according to the invention the holding position of the brake valve device has been converted into a first service position and the functions of said holding position have been eliminated.

In first service position of the rotary valve 22 a new cavity 48 provided in the rotary valve connects the preliminary exhaust port 33 with passage 38 leading to the reduction limiting reservoir 41. Through this communication the equalizing reservoir pressure is adapted to reduce at the usual service rate to substantial equalization into the reduction limiting chamber 42 followed by a further reduction in equalizing reservoir pressure at a slower rate through the restricted port 44 into the reduction limiting chamber 43 to equalization therein. The equalizing discharge valve piston 14 will respond to such reduction in equalizing reservoir pressure to effect a corresponding rate and degree of reduction in pressure in the brake pipe 31.

The volume of the reduction chamber 42 is so related to that of equalizing reservoir 1 as to provide for operation of the equalizing piston 14 to effect a service reduction in pressure in the brake pipe 31, such as five or six pounds, to cause the usual serial, quick service action of the usual brake controlling valve device (not shown) on the cars through the train for initiating an application of the car brakes. The continued or further reduction, of two or three pounds, in equalizing reservoir pressure at a slower rate through the choke 44 into and limited by the volume of the reduction chamber 43 is then adapted to provide a gradual increase in the service application of brakes on the cars to a limited, relatively low degree such as will cause a gentle gathering of the slack in the train toward the front end.

It is intended that, particularly on long trains, this first service position of the brake valve device will be initially employed for slack gathering purposes and then the brake valve device will be moved to service position for effecting a further service reduction in brake pipe pressure in the usual manner to cause a desired decelerating or stopping the train.

The independent brake valve device 2 is as hereinbefore mentioned identical to that employed in the No. 6-ET locomotive brake equipment. This brake valve device is shown in its usual running position and since the operation of the invention is independent of this brake valve device further description thereof is not deemed essential.

The distributing valve device 3 comprises the usual application portion 50 and equalizing portion 51.

The application portion 50 comprises an application piston 52 having at one side a chamber 53 commonly known as the application cylinder, and having at the opposite side a chamber 54 which is in constant communication with the brake cylinder device 8 through a passage 55 and a pipe 56. The piston 52 is provided with a stem 57 extending through the chamber 54 and mounted on this stem is a baffle piston 58 separating said chamber from a valve chamber 59. Projecting into the valve chamber 59 from the baffle piston 58 is a stem 60 and mounted between two spaced shoulders on said stem for operation thereby is an exhaust slide valve 61. The valve chamber 59 is in constant communication with the brake cylinder device 8 through a passage 62 and pipe 56, and the slide valve 61 is provided for controlling communication between said chamber and thereby the brake cylinder device and a brake cylinder release port 63. In the normal release position of the application piston 52 and thereby of the slide valve 61 as shown in the drawings the valve chamber 59 is open to the release port 63 to thereby provide for the release of fluid under pressure from the brake cylinder device 8 for releasing the brakes on the locomotive. The piston 52 is movable upon the supply of fluid under pressure to the application cylinder 53 in the direction of the right-hand to shift the slide valve 61 from the position shown to a position for closing communication from valve chamber 59 to the release port 63.

The application portion 50 of the distributing valve device has a chamber 64 above the valve chamber 65 which is constantly supplied with fluid under pressure from the main reservoir 4. A slide valve 65 contained in chamber 64 is connected by a pin 66 to the piston stem 60 so as to move therewith. In the release position of the application piston 52 the pin 66 is adapted to position the slide valve 65 as shown to close communication between chambers 64 and 59. When the application piston 52 is moved to its application position above mentioned, the slide valve 65 is adapted to be so positioned that a port 67 therein opens communication between the valve chambers 64 and 59 so as to thereby supply fluid at main reservoir pressure from the valve chamber 64 to chamber 59 and thence to the brake cylinder device 8 for applying the brakes on the locomotive. Fluid at the pressure obtained in the brake cylinder device acts through passage 55 in chamber 54 between the application piston 52 and baffle piston 58 and thereby on the application piston in opposition to the pressure of the actuating fluid in the application cylinder 53. Thus when the pressure in the brake cylinder device is increased to a degree substantially equal to or slightly exceeding that provided in the application cylinder 53, the piston 52 will be operated to pull the slide valve 65 from its application position just mentioned back to a lap position for cutting off the supply of fluid under pressure to the valve chamber 59 and thereby to the brake cylinder device 8. Looseness is provided between the exhaust slide valve 61 and stem 60 to permit movement of the application slide valve 65 to its lap position just described without operating the exhaust slide valve 61 whereby in lap position the fluid pressure in the brake cylinder device 8 will be bottled therein. It will thus be apparent that the application portion of the distributing valve device is operative in accordance with the pressure of fluid supplied to the application cylinder 53 to provide a corresponding pressure in the brake cylinder device 8.

The equalizing portion 51 of the distributing valve device comprises an equalizing piston 68 having at one side a chamber 69 which is in constant communication with the brake pipe 31. At the opposite side of piston 68 is a valve chamber 70 in constant communication through a passage 71 with a pressure chamber 72. The valve chamber 71 contains a main slide valve 73 and an auxiliary slide valve 74 which are connected by a stem 75 to the piston 68 for operation thereby.

When the equalizing piston 68 and the slide valves 73 and 74 are in their release positions shown, a feed groove 76 connects the equalizing piston chamber 69 to the valve chamber 70 and through this communication fluid supplied from the brake pipe 31 to the equalizing piston chamber 69 is adapted to flow to valve chamber 70 and thence to the pressure chamber 72 for charging said valve chamber and pressure chamber with fluid at the pressure provided in said brake pipe by operation of the automatic brake valve device in running position.

With the slide valves 73 and 74 in their release position shown, an application passage 77, and the usual application cylinder pipe 78 which is constantly open to said passage, are connected through a cavity 79 in slide valve 73 to the usual distributing valve release pipe passage 80. The passage 80 is in communication with the distributing valve release pipe 81 which is open to the atmosphere with the independent brake valve device 2 in its release position shown so as to thereby provide for the release of fluid under pressure from the application cylinder passage 77 and pipe 78. An application chamber 94 in the distributing valve device is connected through a passage 82 to cavity 79 in slide valve 73 when in its release position shown and is thus also normally vented through the distributing valve release pipe 81.

When the pressure of fluid in brake pipe 31 is reduced by operation of the automatic brake valve device 1 as hereinbefore mentioned, a corresponding reduction in pressure occurs in the equalizing piston chamber 69. When the pressure in chamber 69 is thus reduced to a sufficient degree below that acting in the valve chamber 70, the equalizing piston 78 is adapted to be moved in the direction of the right-hand to a service position defined by engagement between said piston and a spring pressed stop 83. The initial movement of the equalizing piston 68 toward service position moves the auxiliary slide valve 74 relative to the main slide valve 73 to a position in which a service port 84 is open to the valve chamber 70. Continued movement of the piston 68 to service position then shifts the main slide valve 73 to a position in which the service port 84 is brought into registry with a passage 85 which is open to the application cylinder passage 77 and application cylinder pipe 78. In the service position of the main slide valve 73 a cavity 86 therein connects the passage 85 to the passage 82 leading to the application chamber 94.

With the parts conditioned as just mentioned, fluid under pressure from the valve chamber 70 and from the pressure chamber 72 is adapted to flow through the service port 84 to the application cylinder passage 77, application cylinder pipe 78, and into the application chamber 94 until the pressure of fluid in the valve chamber 70 and pressure chamber 72 is reduced to a degree slightly less than the reduced brake pipe pressure in the equalizing piston chamber 69. The reduced brake pipe pressure will then move piston 68 in the direction of the left-hand to thereby shift the auxiliary slide valve 74 relative to the main slide valve 73 to lap position in which the service port 84 is lapped by the auxiliary slide valve so as to thereby prevent further supply of fluid under pressure to the application cylinder passage 77, pipe 78 and application chamber 94.

It will thus be apparent that when the pressure of fluid in the brake pipe 31 is reduced by operation of the brake valve device 1, the equalizing portion 51 of the distributing valve device will respond thereto to effect a corresponding reduction in pressure in the valve chamber 70 and in the pressure chamber 72. The volume of the application chamber 94 is so related to that of the pressure chamber 72 that for each pound reduction in pressure in the brake pipe 31 and thereby in the pressure chamber 72, a certain increase in pressure, such as two and one half pounds, will be obtained in the application chamber 81, and as will be apparent this pressure in the application chamber 94 will be effective in both the application cylinder passage 77 and pipe 78 with the parts of the equalizing valve device in the service and lap positions just mentioned.

In the No. 6-ET locomotive brake equipment the passage 77 is open directly to the application cylinder 53 so that the application piston 52 will operate upon the supply of fluid under pressure to the application chamber 94 and in accordance with the degree of such pressure to provide a corresponding pressure in the brake cylinder device 8 for braking the locomotive.

According to the invention, however, direct communication between the application cylinder passage 77 and the application cylinder or piston chamber 53 is closed, as by means of a plug 87 disposed in passage 77 adjacent said cylinder. The usual plain cover heretofore employed for closing the open end of the application cylinder 53 is also replaced by a delay valve device 88 the casing of which constitutes a cover for the open end of said cylinder and which contains means for delaying the flow of fluid under pressure from the application cylinder passage 77 to the application cylinder 53.

The delay valve device 88 comprises a flexible diaphragm 89 which is clamped around its periphery between the casing of the device and a removable cover 99. The diaphragm 89 has at one side a chamber 90 which is open to the atmosphere through a breather port 91. At the opposite side of the diaphragm 89 is a chamber 92 which is open to a bore 93. A valve piston 95 is disposed in bore 93 and has adjacent each end an annular guide 104 slidably engaging the side wall of said bore. One end of valve piston 95 bears against the diaphragm 89, while the opposite end of said valve piston is provided with an annular seat rib 96 adapted to effect sealing engagement with a ring gasket 97 disposed at the closed end of the bore 93. The end of the valve piston 95 opposite that engaging diaphragm 89 is open through a port 98 in the gasket 97 to a passage 101 one end of which registers with a bore 102 provided in the application portion 50 of the distributing valve device and connected to the application cylinder passage 77 between the plug 87 and the equalizing portion of said device.

The valve piston 95 is provided to control communication between passage 101 and a passage 103 which leads to the application cylinder 53. It will be noted that with the valve piston in sealing engagement with gasket 97, this communication is closed but movement of said valve piston from this position will open the communication. The diaphragm chamber 92 is in constant communication with the application cylinder 53 through slots 105 provided in valve piston guides 104 and passage 103.

The casing of the delay valve device is provided with a chamber 106 which is connected to the passages 101 and 103 and which contains a check valve 107 so arranged as to prevent flow of fluid under pressure in the direction from passage 101 to passage 103 but providing for the flow of fluid under pressure in the opposite direction.

A spring 108 disposed in chamber 90 acts on the diaphragm 89 for urging same and thereby the valve piston 95 to the positions shown in which said valve piston is in sealing engagement with the gasket 97. The pressure of this spring is such as to hold the valve piston in contact with the gasket 97 when the pressure of fluid acting within the seat rib 96 is less than a chosen degree, such as fifteen pounds.

The parts of the delay valve device are shown in Fig. 1 in their normal or release positions which will be obtained when the parts of the distributing valve device are in their release positions, as shown.

When the distributing valve device operates upon a reduction in brake pipe pressure to supply fluid under pressure to the application chamber 94 and to the application cylinder passage 77, as hereinbefore mentioned, the fluid pressure obtained in passage 77 flows therefrom to passage 101 in the delay valve device 88 and thence through opening 98 in gasket 97 and acts on the valve piston 95 within the seat rib 96 against the opposing pressure of spring 108 on the diaphragm 89. When the pressure of fluid thus obtained on the valve piston 95 is increased to a sufficient degree, such as fifteen pounds, to overcome the opposing pressure of spring 108, said valve piston is moved away from the gasket 97 and thereby opens communication between the passages 101 and 103 which permits the pressure of fluid in the application chamber 94 to become effective in the application cylinder 53. The fluid pressure thus obtained in the application cylinder then actuates the application piston 52 to effect a supply of fluid to the brake cylinder device 8 at a corresponding pressure for applying the brakes on the locomotive. The volume of the application cylinder 53 as governed by the displacement of the application piston 52 is so small in distributing valve devices with respect to the volume of the application chamber 94 as to have substantially no effect upon the pressure of fluid in the application chamber upon movement of said piston. It will therefore be apparent that the pressure of fluid initially obtained in the application cylinder 53 and thus in the brake cylinder device 8 upon operation of the delay valve device will correspond substantially to that obtained in the application chamber 94 prior to operation of said delay valve device and thus bear the usual and proper relation to the degree of brake pipe reduction.

When the valve piston 95 moves out of contact with the gasket 97 to supply fluid under pressure to the passage 103, fluid under pressure also flows through the slots 105 in the guides 104 of said valve piston to chamber 92 and therein acts on the diaphragm 89. Since the diaphragm 89 has a greater area subject to pressure in chamber 92 than the area of valve piston 95, the pressure of fluid thus obtained in chamber 92 promptly deflects said diaphragm to an extreme left-hand position defined by engagement with the casing to thereby insure that the valve piston 95 will be moved away from the gasket 97 to a sufficient extent to allow free flow of fluid under pressure from the passage 101 to the passage 103.

The delay valve device 88 thus acts upon a reduction in brake pipe pressure to delay the application of locomotive brakes until a certain pressure is obtained in the application chamber 94 which requires a certain reduction in brake pipe pressure. Assuming that the delay valve device operates at the time a pressure of fifteen pounds is obtained in the application chamber 94, the application of locomotive brakes is delayed until after a six pound reduction in brake pipe pressure is effected.

The volume of the reduction chambers 42 and 43 in the reduction limiting reservoir 41 may be such, as before described, as to limit the reduction in pressure in the equalizing reservoir 7 and thereby in the brake pipe 31 to a degree such as seven or eight pounds for causing a light application of brakes on the cars of the train. Assuming therefore that the brake application is initiated by use of first service position of the brake valve device the brakes on the locomotive will automatically be held off until after a certain light limited reduction in brake pipe pressure has been made for causing a correspondingly light and limited slack gathering application of brakes on the cars of a train. The inertia of the locomotive will thus be maintained effective for a certain period of time after initiating the application of brakes on the cars to insure a gentle gathering of the slack in long trains, such as freight trains. After using first service position of the automatic brake valve device, it is then necessary that the engineer move said brake valve device to service position for effecting a further reduction in brake pipe pressure to cause an increase in the degree of braking of the locomotive and cars of the train to provide a desired deceleration or stopping thereof, it being noted that after the delay valve device operates as above described, the brakes on the locomotive will apply along with those on the cars in accordance with the further reduction in brake pipe pressure, in the usual manner.

In the braking of certain passenger trains, it is customary for the engineer to make a straight away heavy application of brakes and to then gradually release the brakes in steps as the train speed reduces. In order to effect such an unlimited application of brakes the engineer must move the brake valve device directly to the usual service position and thus not use the new first service positions. There is a relatively small amount of slack in passenger trains but a rough gathering thereof is undesirable in that it is apt to cause discomfort to passengers. Rough gathering of slack under the condition just set forth is however avoided by use of the delay valve device since it will operate the same when the application of brakes is effected entirely by use of the service position as when the first service position is initially employed, as above described. Thus in passenger service the delay valve device will delay the application of brakes on the locomotive so that its inertia may be effective to minimize shocks incident to the gathering of train slack.

When it is desired to effect a release of brakes on the locomotive and cars of a train the brake valve device is returned to a charging position, for instance running, to again supply fluid under pressure to the brake pipe 31 for recharging same. The consequent increase in pressure in the equalizing piston chamber 69 of the distributing valve device moves the equalizing piston 68 and thereby the slide valves 74 and 73 back to their release positions shown in which the application cylinder passage 77 and application chamber 94 are both placed in communication with the distributing valve release pipe 81 which is open to the atmosphere through the independent brake valve device 2. As the fluid under pressure is thus vented from the application chamber 94 and application passage 77, the fluid under pressure in the application cylinder 53 is released by way of passage 103 past the check valve 107 and thence through passage 101 along with that from the application cylinder passage 77. Brake cylinder pressure acting in chamber 54 at the opposite face of the application piston 52 then effects movement of said piston and thereby of the release slide valve 61 to their release positions shown in which the brake cylinder 8 is placed in communication with the atmospheric exhaust port 63 to thereby effect a release of brakes on the locomotive.

As fluid under pressure is released from the application cylinder 53, fluid pressure is also vented from diaphragm chamber 92 in the delay valve device by way of slots 105 in the guide portions 104 of the valve piston 95 and thence through passage 103. When the pressure in chamber 92 is thus reduced sufficiently, the spring 108 returns diaphragm 89 and thereby the valve piston 95 to the position shown in which said valve piston is in sealing contact with the diaphragm 97.

It will be noted that the communication including the check valve 107 provides for the release of fluid under pressure from the application cylinder 53 independently of valve piston 95 in effecting a release of brakes. The purpose of the check valve 107 is to prevent the flow of fluid under pressure directly from the passage 101 to the passage 103 in effecting an application of brakes, so that the supply of fluid to the application chamber 53 may be delayed by operation of the valve piston 95, as hereinbefore described.

From the above description it will now be apparent that the desired delay of brake application on a locomotive required to provide for gentle gathering of slack in trains is obtained merely by substituting for the usual plain application cylinder cover of the well known No. 6–ET distributing valve device, the relatively simple delay valve device 88 arranged to delay the flow of fluid under pressure to the application cylinder 53 in effecting an application of brakes. The relatively slight modifications in the brake valve device of the No. 6–ET locomotive brake equipment, consisting of the conversion of the old holding position to a new first service position and the addition to the brake valve device of the reduction limiting reservoir, provides an arrangement whereby, without watchfulness on the part of an engineer, the initial stage of a brake application on a train may be automatically regulated or limited at the same time as the application of brakes on the locomotive of a train is delayed, so as to insure gathering of slack in long trains without damaging shocks.

*Description—Fig. 3*

Since the delay valve device 88 shown in Fig. 1 and above described operates the same in both first service and service positions of the brake valve device 1, it will provide the same degree of delay in the application of locomotive brakes for all types or classes of trains, whether long freight trains or shorter passenger trains. Assuming that the delay valve device 88 is designed to provide the most effective delay of brake application on a locomotive for use in freight service, such delay might not only be excessive but also unnecessary when the locomotive is controlling a passenger train or vice versa. The delay valve device 88 shown in Fig. 1 must therefore be designed to meet either one class of service or another or as a compromise for the different classes of service.

If it is desired to provide different degrees of hold back for the application of locomotive brakes which are best suited to these different classes of service, the modified form of the invention shown in Fig. 3 may be employed.

The brake equipment shown in Fig. 3 differs from that shown in Fig. 1 and above described in that the cover 99 of the delay valve device 88 is replaced by a cover 110 having a bore in which there is slidably mounted a plunger 111. A spring 112 is interposed between one face of this plunger and the diaphragm 89. The opposite face of the plunger 111 engages one face of a flexible diaphragm 113.

The space between the plunger 111 and diaphragm 89 is vented to the atmosphere through ports 114 in the plunger and a passage 115 in the cover. The chamber at the side of diaphragm 113 which engages the plunger is also open to the atmosphere through clearance space which will exist between the plunger and the bore in the cover in which it operates, said space being open to the atmospheric port 115. At the opposite face of plunger 111 is a chamber 116 which is connected by a pipe 117 to the pipe bracket 9 of an automatic brake valve device 1a.

The brake valve device 1a differs from the automatic brake valve device 1 shown in Fig. 1 in that a new passage 118 is provided which connects the pipe 117 to the seat of the rotary valve 22. The rotary valve 22a employed in this brake valve device embodies all the functions of the rotary valve 22 employed in the brake valve device 1 shown in Fig. 1 and the additional function of controlling the passage 118. For controlling this passage the rotary valve 22a is provided with a cavity indicated by the reference numeral 119 in Fig. 4 for connecting said passage to the feed valve passage 29 in the first service position of the brake valve device. In running, service, lap and emergency positions of the brake valve device the new passage 118 is vented through the atmospheric vent port 36 by way of cavities indicated in Fig. 4 by reference numerals 146, 147, 148 and 149, respectively.

When the pipe 117 and chamber 116 are vented, the spring 112 acting on plunger 111 is adapted to urge said plunger and thereby the diaphragm 113 to a position defined by engagement between the diaphragm and a stop 120. This is the position which the parts of the hold back device will assume when the brake valve device 1a is moved to the usual service position for initiating an application of the brakes. With the spring 112 thus extended its pressure on the diaphragm 89 is less than that of spring 108 in the hold back valve device shown in Fig. 1, but is of such value as to delay the application of brakes on the locomotive for a sufficient time, when coupled to a passenger train, to avoid rough slack action and consequent discomfort to passengers when a straight-away application of the brakes is effected as above described.

When the locomotive is coupled to a long freight train and first service position of the brake valve device 1a is used for initiating an application of brakes, the new passage 118 is connected to the feed valve device 5 as above described so that fluid at feed valve pressure is allowed to flow through the pipe 117 to the diaphragm chamber 116. This pressure acting on the diaphragm 113 is adapted to deflect same in the direction of the right hand until a shoulder 121 on the plunger 111 engages the casing. This movement of the plunger acts to compress the spring 112 and to thereby increase its force on the diaphragm 89 to such a degree as to hold the valve piston 95 in sealing contact with the gasket 97 as long as the brake valve device 1a is in the first service position.

As above described, the first service position of the brake valve device is primarily intended for use in effecting a light, slack gathering reduction in brake pipe pressure on long trains, and then the brake valve device should be moved to service position for effecting a further brake pipe reduction. Upon movement to service position, the diaphragm chamber 116 in the delay valve device is vented through pipe 117, passage 118 in the brake valve device, cavity 147 in rotary valve 22a and vent port 36, and this allows the spring 112 to expand and thereby reduce its pressure on the diaphragm 89. When this occurs, the fluid pressure acting in the application passage 77, passage 101, port 98 and on the valve piston 95 promptly moves said valve piston out of contact with the gasket 97 and then flows to the application cylinder 53 to effect operation of the application portion of the distributing valve device to apply the brakes on the locomotive.

This embodiment of the invention thus prevents all application of locomotive brakes in first service position of the brake valve device so as to accomplish the desired end of rendering the inertia of the locomotive effective to retard the gathering of slack in long trains, but when the brake valve device is subsequently moved to the usual service position, the brakes on the locomotive will be applied and produce substantially the same result as obtained by the apparatus shown in Fig. 1, under the same condition.

By providing a positive control or cut out of the delay valve device in first service position of the brake valve device in this embodiment of the invention, different degrees of delay suitable for different lengths of trains and therefore different classes of service are obtained.

Description—Fig. 5

When, in the brake equipments shown in Figs. 1 and 3, the delay valve device operates to open communication between passages 101 and 103, the pressure of fluid in the relatively small volume of the application cylinder 53 will promptly build up without further reduction in brake pipe pressure to the degree acting in the application chamber 94 or in other words, to the pressure that would have been obtained in the application cylinder 53 if the delay valve were not used and the resulting application of locomotive brakes might cause such slack action between the locomotive and cars of a train as would be objectionable. Such objectionable slack action may be avoided by use of the delay valve device 122 shown in Fig. 5 which is so designed as to operate after the desired delay period to provide a gradual supply of fluid to the application cylinder 53 depending upon and in proportion to a continued supply of fluid under pressure to the application chamber 94, whereby the brakes on the locomotive will gradually apply after the delay period and thus avoid the development of shocks.

The delay valve device 122 comprises a casing removably secured to the distributing valve device over the application cylinder 33 and constituting a cover therefore. The casing has a valve chamber 124 connected by a passage 123 to bore 102 and thereby to the application passage 77 in the distributing valve device. The casing also has a passage 125 connected to the application cylinder 53 and to a passage 126 which is connected to the application cylinder pipe 78, it being noted that in this embodiment, the application cylinder pipe 78 is connected to the delay valve device 122 instead of to its usual connection with the distributing valve device as in Fig. 1, this usual connection being closed in this embodiment by a plug 127.

The valve chamber 124 is formed at one side of a flexible diaphragm 128 which is clamped between the casing and a ring 150 secured to said casing, the chamber 124 contains a slide valve 129 which is connected by a stem 130 to diaphragm 128 for movement therewith. At the opposite side of the diaphragm 128 is a chamber 131 which is open to the passage 126 and which contains a strut member 132 operatively connecting the diaphragm 128 to another and smaller diaphragm 133 which is clamped between the ring 150 and a cover 151. The diaphragm 133 is thus subject on one face to the pressure in chamber 131 and has at its opposite face a chamber 134 formed in the cover 151 and open to the atmosphere through the passage 135.

A spring 136 in chamber 134 acts on the diaphragm 133 for urging same and thereby the strut 132, diaphragm 128 and stem 130 in a downwardly direction to a position defined by engagement between said stem and an annular shoulder 136 in the casing. The passage 126 has a branch 137 which leads to the seat of slide valve 129. The application cylinder passage 125 is connected by a passage 138 to the seated side of a check valve 139 which is contained in a chamber 140. The chamber 140 is connected by a passage 141 to the seat of the slide valve 129. When there is no fluid pressure in the application passage 77 and thus in valve chamber 124, the pressure of spring 136 holds the slide valve 129 in the position shown lapping passage 137 and opening communication between the passage 141 and valve chamber 124.

This distributing valve device is adapted to operate in the same manner in both the first service position and in the old service position of the engineer's brake valve device and is therefore adapted to be used in a brake equipment embodying the automatic brake valve device 1 shown in Fig. 1.

When it is desired to effect an application of the locomotive brakes, the brake valve device 1 is moved to either first service position or to the old service position, depending upon the class of train to which the locomotive is coupled, for effecting a reduction in pressure in the brake pipe 31, as hereinbefore described. The equalizing portion 51 of the distributing valve device responds to such brake pipe reduction and supplies fluid under pressure to the application chamber 94 and to the application passage 77. The fluid pressure thus obtained in passage 77 flows into the valve chamber 124 in the delay valve device 122 and therein acts on the diaphragm 128 against the opposing pressure of the spring 136, chamber 131 being at atmospheric pressure at this time as will be apparent from the description to follow in connection with effecting a release of locomotive brakes. It will be noted that passage 137 is lapped by the slide valve 129 at this time so as to prevent flow of fluid under pressure from the valve chamber 124 to the application cylinder 53. The brakes on the locomotive will not apply therefore with slide valve 129 in this position.

When the pressure of fluid in the valve chamber 124 acting on the diaphragm 128 is increased to a sufficient degree to overcome the opposing pressure of spring 136, said diaphragm starts moving slide valve 129 in an upwardly direction. The initial upward movement of slide valve 129 laps the passage 141 following which said slide valve starts opening passage 137 to valve chamber 124, and when this occurs, fluid under pressure from said valve chamber starts flowing to passage 126 and thence into the diaphragm chamber 131 and also through passage 125 to the application cylinder 53 for initiating the application of locomotive brakes.

The fluid pressure thus supplied to chamber 131 acts on the diaphragm 133 to reduce the effective pressure of spring 136 and at the same time acts on the larger diaphragm 128 not only to offset the reduced effectiveness of spring 136 but also to provide such additional force opposing the pressure of fluid in chamber 124 acting on the diaphragm 128 as to limit the increase in pressure in chamber 131 and thus in the application cylinder 53 to a degree equal to the reduction in effectiveness of spring 138. In other words, for a certain increase in pressure in chamber 124, the pressure obtained in chamber 131 will be limited to a degree which acting on the larger diaphragm 128 plus the reduced effectiveness of spring 136 (pressure of spring 136 less the pressure of fluid in chamber 131 acting on the smaller diaphragm 133) will be sufficient to balance the pressure in chamber 124 acting on the larger diaphragm 128. It will therefore be evident that this delay valve device will operate upon an increase in pressure in chamber 124 to provide an increase in pressure in chamber 131 to a less degree and equal to the reduced effectiveness of spring 136. The differential between the fluid pressures in chamber 124 and 131 reduces as the pressure in chamber 124 increases since the increase in pressure in chamber 131 acts to correspondingly reduce the effective force of spring 136, until finally the force of said spring will become balanced by the pressure of fluid obtained in chamber 131. Movement of the slide valve 129 to open position being then unopposed, the pressure of fluid in chamber 124 will maintain the diaphragm 128 and thereby the slide valve 129 in the open position to permit equalization of the fluid pressures in the application chamber 94, chamber 124, chamber 131 and in the application cylinder 53.

Since this delay valve device may be used in both freight and passenger service, it is therefore necessary that the delay in brake application on the locomotive be such as to best meet the classes of service. The area of the diaphragm 128 with respect to the pressure of spring 136 is therefore preferably so related that said spring will hold said diaphragm and thereby the slide valve 129 in their lap positions shown in the drawings until, following the initiation of a brake application, the pressure of fluid obtained in the application chamber 94 and valve chamber 124 by operation of the equalizing portion of the distributing valve device is increased to a desired degree, such for instance as eight pounds, depending upon the degree of delay in application of locomotive brakes desired. Upon a further increase in pressure in chamber 124 the brakes on the locomotive will start to gradually apply at a rate proportional to the service rate of supply of fluid under pressure to the valve chamber 124 and to a degree proportional to the pressure increase in chamber 124, which proportional increase is governed by and equals substantially the reduction in effectiveness of spring 136.

When the normal brake pipe carried in a train is seventy pounds, a full service reduction in brake pipe pressure results in fifty pounds pressure being obtained in the brake cylinder device on cars of the train. Under this same condition a distributing valve device will operate to provide fifty pounds pressure in the application chamber 94. The area of the smaller diaphragm 133 is therefore preferably so related to the pressure of spring 136, that when substantially fifty pounds pressure is obtained in chamber 131, said spring will be just overcome so as to permit equalization of pressures in the application chamber 94 and application cylinder 53. It will thus be apparent that fluid pressure will start to build up in the application cylinder 53 after the eight pounds delay pressure is obtained in the application chamber 94 and then gradually increase as the pressure in chamber 94 is increased until finally upon completion of a full service reduction in brake pipe pressure equalization of pressures in the chamber 94 and cylinder 53 will occur at the usual full service degree. The resultant gradual application of locomotive brakes after the delay period, will provide for the gentle gathering of slack in long freight trains and also avoid harsh slack action between the locomotive and cars of passenger trains in the particular service position of the brake valve device 1 employed in connection with these different classes of service.

It will be noted that the application of locomotive brakes is delayed by the delay valve device 122 only until substantially eight pounds pressure is obtained in the application chamber 94 in contrast to the fifteen pound delay provided with the delay valve device 88 shown in Fig. 1 and above described. It should also be noted however, that the fifteen pounds pressure in the application chamber 94 required to operate the delay valve device 88 is obtained upon substantially a six pounds reduction in brake pipe pressure and to obtain a like pressure in the application cylinder 53 with the delay valve device 122 requires substantially an eight pound reduction in brake pipe pressure. An application of locomotive brakes with the delay valve device 122 to the same degree as provided at the instant of operation of the delay valve device 88 is thus not obtained as soon as with the delay valve device 88 and even though the delay valve device 122 permits the locomotive brakes to start applying sooner than the delay valve device the overall effect of locomotive inertia on gathering of train slack may be the same. However the gradual application of locomotive brakes obtained by the delay valve device 122 after the delay period avoids the development of undesired slack action which may occur under certain conditions with the delay valve device 88, as hereinbefore mentioned.

In order to effect a release of the locomotive brakes after an application, the brake pipe 31 is recharged with fluid under pressure and the equalizing portion 51 of the distributing valve device is returned to its release position in which the application passage 77 and application chamber 94 are placed in communication with the distributing valve release pipe 81 as hereinbefore described. Since the pipe 81 is open to the atmosphere through the independent brake valve device 2 in running position the fluid pressure in the application passage 77 and chamber 94 will be thus vented to the atmosphere.

Fluid under pressure will be vented from chamber 124 in the delay valve device 122 along with that from the application passage 77, and assuming that the release is subsequent to a full service application of brakes a slight venting of fluid under pressure from the application cylinder 53 may occur through passages 125, 126 and 137 and past the slide valve 129 to valve chamber 124. As soon however as the pressure of fluid in chamber 131 acting on diaphragm 133 becomes reduced to a degree below the pressure of spring 136, said spring becomes effective to move the diaphragms 133 and 128 and thereby the slide valve 129 back to their normal positions lapping passage 137 and in which passage 141 is open to valve chamber 124 so that the further release of fluid under pressure from the application chamber 53 and diaphragm chamber 131 then occurs through passages 125, 126, 138, past check valve 139, and through chamber 140 and passage 141 along with the release of fluid under pressure from chamber 124. It will be noted that the release of fluid under pressure from the application cylinder 53 occurs with the release of fluid under pressure from the application chamber 94 whereas in effecting an application of brakes the build up of pressure in the application cylinder 53 is delayed with respect to the build up in the application chamber 94.

The check valve 139 is provided to prevent the flow of fluid under pressure through the release communication just traced from the valve chamber 124 to the application cylinder 53 in effecting an application of brakes.

As before mentioned, the application cylinder pipe 78 in this embodiment of the invention is connected directly to the application cylinder 53 by way of passage 126 and thus by-passes the delay slide valve 129 so that the usual control of application cylinder pressure through said pipe may be obtained without operation of the delay valve device.

Description—Fig. 6

The delay valve device 122 shown in Fig. 5 and just described provides for only one degree of hold back of locomotive brakes, and such degree must therefore be suited to either one or another class of service or be a compromise for the different classes of service. If desired, however, the delay valve device 122 may be modified as shown in Fig. 6 to provide different degrees of hold back suitable for different classes of service.

In accordance with this modification, the cover 151 of the delay valve device 122 shown in Fig. 5 is replaced with a casing section 155 on which is mounted a cover 142. A flexible diaphragm 143 is clamped around its rim between the casing section 155 and cover 142. Interposed between this diaphragm and the diaphragm 133 is a control spring 144 corresponding in function to spring 136 but having different characteristics. The diaphragm 143 has at its opposite face a chamber 145 which is adapted to be connected to pipe 117 leading to the brake valve device 1a shown in Fig. 3.

The spring 144 acts to urge the diaphragm 143 in the direction of cover 142 and when the chamber 145 is vented such movement is limited by engagement of said diaphragm with a stop 146 provided in the cover. This condition or position of the diaphragm 143 and spring 144 is adapted to be obtained at all times except when the brake valve device 1a is in first service position. When the brake valve device 1a is in first service position, fluid pressure supplied to pipe 117 is adapted to act in chamber 145 to deflect the diaphragm 143 downwardly to a position defined by engagement between a follower plate 156 and a shoulder 157 in casing section 155. Thus when first service position of the brake valve device is used as in initiating an application of brakes on a long train, the pressure of spring 144 will be of a desired value to provide the degree of hold back of locomotive brakes most suitable to this class of service, while when service position of the brake valve device is employed as in initiating an application of brakes on passenger trains, a less degree of hold back will be obtained which is best suited to this particular class of service.

The pressure of spring 144 when conditioned for use with long freight trains in first service position of the brake valve device may therefore delay the application of locomotive brakes until after any desired pressure, such as ten pounds is obtained in the application chamber 94 and then provide a gradual application in the same manner as provided by the delay valve device 122 shown in Fig. 5. In contrast, the spring 144 when expanded in service position of the brake valve device may delay the application of locomotive brakes only until for instance five pounds pressure is obtained in the application chamber 94 and then provide for the gradual application of locomotive brakes. In both cases the degree of hold back or delay in the application of locomotive brakes may therefore be suited to the particular class of service in which the locomotive is employed.

A release of brakes after an application is effected with this embodiment of the invention in the same manner as obtained with the embodiment shown in Fig. 5 and above described.

Description—Fig. 7

In the delay valve devices 88 and 122 any leakage of fluid under pressure past the valves therein to the application cylinder 53 would be liable to result in such an increase in pressure in said cylinder as to cause a premature application of locomotive brakes, it being recalled that, as hereinbefore pointed out, the application cylinder 53 is of relatively small volume.

Such premature application of locomotive brakes would of course be undesirable and may be completely avoided by the delay valve device 160 shown in Fig. 7.

The delay valve device 160 differs from the delay valve device shown in Figs. 5 and 6 in that the slide valve 129 is replaced by a slide valve 161 having a cavity 162 adapted in the normal position of the device to connect passage 137 and thereby the application cylinder 53 to an atmospheric port 163. By this arrangement the application cylinder 53 will be maintained at atmospheric pressure, regardless of leakage in the device, until it is desired that the locomotive brakes start to apply. No premature application of the locomotive brakes can therefore possibly occur with this delay valve device.

In effecting a release of locomotive brakes after an application, the venting of fluid under pressure from the application cylinder 53 is controlled by the slide valve 161 as governed in turn by the pressure of fluid in chambers 124 and 131 acting on the diaphragms 128 and 133 in addition to the pressure of the spring acting on the diaphragm 133. To be more specific, when in effecting a release of fluid under pressure from the application chamber 94, the pressure of fluid in chamber 124 on diaphragm 128 is sufficiently reduced, the application cylinder pressure in chamber 131 will deflect the diaphragm 128 downwardly and move the slide valve to the position for connecting passage 126 to the release port 163. Fluid under pressure will then be released from the application cylinder 53 and diaphragm chamber 131, but such release will occur only in accordance with the reduction in pressure in chamber 124 acting on the diaphragm 128 as related to the effectiveness of spring 136 or 144 acting on the diaphragm 133, since the delay valve device will operate in the same manner as in effecting the supply of fluid under pressure to the application cylinder to maintain a certain relation between the fluid pressures in chamber 124 and in the application cylinder 53. When the pressure of fluid in chamber 124 finally becomes reduced to substantially the degree at which the brakes on the locomotive started to apply, the spring 136 or 144 will hold the slide valve 161 in the position shown and permit the final release of locomotive brakes independently of the further release of fluid under pressure from the application chamber 94. Thus in this embodiment of the invention the application cylinder pressure will bear substantially the same relation to brake pipe pressure in both applying and releasing the brakes on the locomotive. In the embodiments of the invention shown in Figs. 5 and 6, pressure of fluid in the application cylinder 53 increases after the delay period in accordance with the reduction in effectiveness of spring 136 or 144 the same as in the embodiment shown in Fig. 7, but it should be noted that the release of fluid under pressure from said cylinder is independent of said spring and occurs directly with the release of fluid under pressure from chamber 124 by way of check valve 139.

*Summary*

It is desirable that the application of locomotive brakes be delayed on long freight trains to avoid harsh and possible damaging gathering of slack in the train. In shorter trains particularly of the passenger carrying class, it is also desirable to delay the application of locomotive brakes to avoid the running in and out of slack between the locomotive and cars of a train and possible discomfort to passengers. It will now be apparent, that these desirable results may be obtained with the well known No. 6-ET locomotive brake equipment merely by substituting a relatively simple delay valve device for the usual application cylinder cover of the distributing valve device employed in said equipment.

While the usual service position of the engineer's automatic brake valve device of the well known No. 6-ET locomotive brake equipment may be employed in braking of trains in all types of service, it is, however, desirable that in long freight trains said brake valve device be operable to automatically provide a limited reduction in brake pipe pressure without attention of the engineer. This desirable feature in the automatic brake valve device of the No. 6-ET locomotive brake equipment is obtained merely by connecting a reduction limiting reservoir to the passage in the brake valve device heretofore connected with the well known distributing valve release pipe and by further converting the holding position of the brake valve device to a first service position and either modifying the old rotary valve or by substituting therefor a new rotary valve adapted in the first service position to connect the equalizing reservoir to the reduction limiting reservoir.

In practice the same degree of delay in the application of locomotive brakes might be used for both freight and passenger trains with acceptable results, and each of the embodiments of the invention shown in Figs. 1 and 5 provide for such. However, if desired, different degrees of delay particularly suited to these different classes of service may be obtained by use of either of the embodiments shown in Figs. 2 and 6.

With the simpler forms of the invention shown in Figs. 1 and 3, the locomotive brakes will promptly apply at the termination of the delay period to the same degree which would have been obtained if the delay valve device were not employed and without any further reduction in brake pipe pressure. These devices while preventing the development of damaging shocks in trains as intended, may therefore still permit the development of shocks of a lesser degree but which will cause some discomfort to passengers in passenger trains. This disadvantage of these relatively simple schemes may however be avoided by the use of the structures shown in Figs. 5, 6, or 7 which provides for a gradual application of the locomotive brakes in accordance with a continued or further reduction in brake pipe pressure after the delay period has terminated.

While several embodiments of the invention have been shown and described in detail, it is not the intention to limit the scope to these embodiments or otherwise than by the terms of the appended claims.

Having now described my invention, what I claim as new and desire to secure by Letters Patent, is:

1. In a locomotive fluid pressure brake equipment, in combination, a brake pipe, a brake cylinder device, a distributing valve device of a No. 6-ET locomotive brake equipment comprising an equalizing portion and an application portion having an application cylinder, and a delay valve device replacing the usual cover over said cylinder, said equalizing portion being operative upon a reduction in pressure in said brake pipe to supply fluid under pressure to an application passage for supply to said application cylinder to effect operation of said application portion to supply fluid under pressure to said brake cylinder device to apply the locomotive brakes, said delay valve device comprising a spring, a movable abutment subject to the opposing pressures of said spring and of the pressure of fluid in said passage, and valve means controlled by said abutment controlling communication between said application cylinder and said application passage and an atmospheric vent port, said abutment being operative upon an increase in pressure in said passage sufficient to overcome said spring to effect operation of said valve means to open said application cylinder to said application passage and when the pressure of fluid in said application passage is of a less degree to operate said valve means to open said application cylinder to said atmospheric vent port.

2. In a locomotive fluid pressure brake equipment, in combination, a brake pipe, a brake cylinder device, a distributing valve device of a No. 6-ET locomotive brake equipment comprising an application portion having an application cylinder, an increase in pressure in which is adapted to effect a supply of fluid under pressure to said brake cylinder device to apply the locomotive brakes, said distributing valve device further comprising an equalizing portion operative upon a reduction in pressure in said brake pipe to supply fluid at a pressure dependent upon the degree of such reduction to an application passage leading to said application cylinder, a plug in said passage closing communication therethrough, a delay valve device comprising a casing removably secured to said distributing valve device over said application cylinder and constituting a cover therefor, said delay valve device having one passage leading to said cylinder and another passage connected to said application passage between said plug and equalizing portion, and valve means in said delay valve device controlling communication between the said passages therein and operative to close such communication when the pressure of fluid in said application passage is less than a chosen degree and to open same when the pressure in said application cylinder passage is greater than said chosen degree.

3. In a fluid pressure brake, in combination, a brake pipe, brake controlling valve means operative upon a reduction in pressure in said brake pipe to supply fluid under pressure through a communication for effecting an application of brakes, delay valve means controlling said communication and normally closing said communication and adapted to operate upon a chosen increase in pressure in said communication to open same, and an engineer's brake valve device operatively connected to said delay valve means and having one position for effecting a reduction in brake pipe pressure and for conditioning said delay valve means to maintain said communication closed.

4. In a fluid pressure brake, in combination, a brake pipe, brake controlling valve means operative upon a reduction in pressure in said brake pipe to supply fluid under pressure through a communication for effecting an application of brakes, valve means controlling said communication, and an engineer's brake valve device having two positions for effecting a reduction in brake pipe pressure, said brake valve device being connected to said valve means and being operative in one of said two positions to effect operation of said valve means to hold said communication closed and in the other of said two positions to render said valve means operable to open said communication.

5. In a fluid pressure brake, in combination, a brake pipe, brake controlling valve means operative upon a reduction in pressure in said brake pipe to supply fluid under pressure through a communication for effecting an application of brakes, a spring, valve means controlled by the opposing pressures of said spring and the pressure of fluid supplied to said communication and operative when the pressure of fluid in said communication is less than the pressure of said spring to prevent flow of fluid under pressure through said communication and when greater than the pressure of said spring to provide for the flow of fluid under pressure through said communication, and an engineer's brake valve device having two positions for effecting a reduction in brake pipe pressure, and operative in one of said two positions to render said spring effective to control the operation of said valve means to open said communication and operative in the other of said two positions to actuate said valve means to maintain said communication closed.

6. In a locomotive fluid pressure brake equipment, in combination, a brake pipe, brake controlling valve means operative upon a reduction in brake pipe pressure to supply fluid under pressure to a chamber an increase in pressure in which is adapted to apply the brakes on the locomotive, delay valve means controlling communication through which fluid under pressure is adapted to be supplied from said brake controlling valve means to said chamber and being operative to either open or close said communication, an equalizing reservoir normally charged with fluid under pressure, a normally vented reduction limiting reservoir, an engineer's automatic brake valve device having a normal position for charging said equalizing reservoir and for venting said reduction limiting reservoir and having a first service position for connecting said equalizing reservoir to said reduction limiting reservoir for effecting a limited reduction in pressure in said equalizing reservoir, said brake valve device also having another service position for connecting said equalizing reservoir with the atmosphere, valve means in said brake valve device operative in accordance with the pressure in said equalizing reservoir to effect a corresponding reduction in pressure in said brake pipe, said brake valve device controlling said delay valve means and being operative in the first service position to effect operation thereof to close said communication and in said service position being operative to render said delay valve means operable to open said communication.

7. In a locomotive fluid pressure brake equipment, in combination, a brake pipe, an engineer's automatic brake valve device having two service positions for effecting a service reduction in pressure in said brake pipe, reduction limiting means operative automatically in one of said service positions for limiting the reduction in brake pipe pressure, brake controlling valve means operative upon a reduction in brake pipe pressure to effect a supply of fluid under pressure to a chamber an increase in pressure in which is adapted to apply the brakes on the locomotive, a delay valve controlling the communication through which fluid under pressure is adapted to be supplied from said brake controlling valve means to said chamber and being operative to either open or close said communication, a spring, means controlled by the opposing pressures of said spring and the pressure of fluid supplied by said brake controlling valve means for controlling said delay valve, said means being operative by said spring to actuate said delay valve to close said communication when the pressure of fluid supplied by said brake controlling valve means is less than the pressure of said spring and being operative when such pressure exceeds the pressure of said spring to open said communication, and a movable abutment adapted to be operated by fluid under pressure for increasing the pressure of said spring to maintain said delay valve seated against the maximum pressure supplied by said brake controlling valve means, said brake valve device being operative in said one service position to supply fluid under pressure for actuating said abutment and in the other service position to vent fluid under pressure from said abutment.

8. In a locomotive fluid pressure brake equipment, in combination, a brake pipe, an engineer's automatic brake valve device having two service positions for effecting a reduction in pressure in said brake pipe, reduction limiting means associated with said brake valve device and operative automatically in one of said service positions to limit the degree of reduction in pressure in said brake pipe, brake controlling valve means operative upon a reduction in brake pipe pressure to effect a supply of fluid under pressure to a chamber an increase in pressure in which is adapted to apply the brakes on the locomotive, a spring, a delay valve controlling communication through which fluid under pressure is adapted to be supplied from said brake controlling valve means to said chamber, said delay valve being controlled by the pressure of said spring and the opposing pressure of fluid supplied by said brake controlling valve means and being operative to open said communication when the pressure of fluid supplied by said brake controlling valve means exceeds the opposing pressure of said spring, and means for adjusting the pressure of said spring controlled by said brake valve device and operative in one of said service positions to provide one degree of spring pressure on said delay valve and in the other service position a different degree of spring pressure on said delay valve.

9. In a locomotive fluid pressure brake equipment, in combination, a brake pipe, an engineer's automatic brake valve device having two service positions for effecting a reduction in pressure in said brake pipe, reduction limiting means associated with said brake valve device and operative automatically in one of said service positions to limit the degree of reduction in pressure in said brake pipe, brake controlling valve means operative upon a reduction in brake pipe pressure to effect a supply of fluid under pressure to a chamber an increase in pressure in which is adapted to apply the brakes on the locomotive, a spring, a delay valve controlling communication through which fluid under pressure is adapted to be supplied from said brake controlling valve means to said chamber, said delay valve being controlled by the opposing pressures of fluid supplied by said brake controlling valve means and said spring and being operative when the pressure of fluid supplied by said brake controlling valve means exceeds the pressure of said spring to open said communication and when less than the pressure of said spring to close said communication, a movable abutment controlled by the pressure of fluid in a chamber for varying the pressure of said spring, said brake valve device in the first service position supplying fluid under pressure to said chamber for acting on said abutment to increase the pressure of said spring to a chosen degree and in said service position venting said chamber to provide a spring pressure of a less chosen degree.

10. A modified No. 6–ET locomotive brake equipment comprising in combination, a brake pipe, an engineer's automatic brake valve device having the usual running position for charging said brake pipe, the usual service position for effecting a service reduction in pressure in said brake pipe, and the usual lap position for limiting a reduction in brake pipe pressure, the usual holding position of said brake valve device being converted to a first service position for effecting a service reduction in pressure in said brake pipe, reduction limiting means connected to the usual distributing valve release pipe passage in said brake valve device and operative in the first service position of said brake valve device for limiting the degree of reduction in brake pipe pressure, a distributing valve device having an application cylinder an increase in pressure in which is adapted to effect an application of locomotive brakes, and having an application chamber and an equalizing portion operative upon a reduction in brake pipe pressure to supply fluid to said application chamber at a pressure in accordance with the degree of reduction in brake pipe pressure, delay valve means associated with said distributing valve device controlling communication between said application chamber and application cylinder and adapted to operate upon a chosen increase in pressure in said application chamber to open said communication, said automatic brake valve device having a new passage, and means operative in the first service position of said brake valve device to effect a variation in pressure in said new passage for actuating said delay valve means to maintain communication between said chamber and cylinder closed and in the service position of said brake valve device to effect a variation in pressure in said new passage to render said delay valve means operative to open said communication.

11. A modified No. 6–ET locomotive brake equipment comprising in combination, a brake pipe, an engineer's automatic brake valve device having the usual running position for charging said brake pipe, the usual service position for effecting a service reduction in pressure in said brake pipe, and the usual lap position for limiting a reduction in brake pipe pressure, the usual holding position of said brake valve device being converted to a first service position for effecting a service reduction in pressure in said brake pipe, reduction limiting means connected to the usual distributing valve release pipe passage in said brake valve device and operative in the first service position of said brake valve device for limiting the degree of reduction in brake pipe pressure, a distributing valve device having an application cylinder an increase in pressure in which is adapted to effect an application of locomotive brakes, and having an application chamber and an equalizing portion operative upon a reduction in brake pipe pressure to supply fluid to said application chamber at a pressure in accordance with the degree of reduction in brake pipe pressure, delay valve means associated with said distributing valve device controlling communication between said application chamber and application cylinder and adapted to operate upon a chosen increase in pressure in said chamber to open said communication, said automatic brake valve device having a new passage and being operative in the first service position for supplying fluid under pressure to said passage and in the usual service position for venting fluid under pressure from said passage, and means associated with said delay valve device operative by fluid pressure supplied to said new passage for actuating said delay valve device to maintain communication closed between said application chamber and application cylinder, said means associated with said delay valve device being inoperative upon the venting of fluid under pressure from said new passage.

12. A modified No. 6–ET locomotive brake equipment comprising in combination, a brake pipe, an engineer's automatic brake valve device having the usual running position for charging said brake pipe, the usual service position for effecting a service reduction in pressure in said brake pipe, and the usual lap position for limiting a reduction in brake pipe pressure, the usual holding position of said brake valve device being converted to a first service position for effecting a service reduction in pressure in said brake pipe, reduction limiting means connected to the usual distributing valve release pipe passage in said brake valve device and operative in the first service position of said brake valve device for limiting the degree of reduction in brake pipe pressure, a distributing valve device having an application cylinder an increase in pressure in which is adapted to effect an application of locomotive brakes, and having an application chamber and an equalizing portion operative upon a reduction in brake pipe pressure to supply fluid to said application chamber at a pressure in accordance with the degree of reduction in brake pipe pressure, delay valve means associated with said distributing valve device comprising a spring, a valve controlling communication between said application chamber and application cylinder and controlled by the opposing pressures of said spring and the pressure of fluid supplied to said application chamber and operative upon an increase in pressure in said chamber exceeding the pressure of said spring to open said communication, said brake valve device having a new passage and being operative in first service position to supply fluid under pressure to said new passage and in service position to vent fluid under pressure from said new passage, said delay valve device further comprising means controlling the pressure of said spring and controlled by the pressure of fluid in said new passage and operative in the first service position of said brake valve device to provide one degree of spring pressure and in said service position a different degree of spring pressure.

13. A modified No. 6-ET locomotive brake equipment comprising in combination, a brake pipe, an engineer's automatic brake valve device having the usual running position for charging said brake pipe, the usual service position for effecting a service reduction in pressure in said brake pipe, and the usual lap position for limiting a reduction in brake pipe pressure, the usual holding position of said brake valve device being converted to a first service position for effecting a service reduction in pressure in said brake pipe, reduction limiting means connected to the usual distributing valve release pipe passage in said brake valve device and operative in the first service position of said brake valve device for limiting the degree of reduction in brake pipe pressure, a distributing valve device having an application cylinder an increase in pressure in which is adapted to effect an application of locomotive brakes, and having an application chamber and an equalizing portion operative upon a reduction in brake pipe pressure to supply fluid to said application chamber at a pressure in accordance with the degree of reduction in brake pipe pressure, delay valve means associated with said distributing valve device comprising a spring, a valve controlling communication between said application chamber and application cylinder and controlled by the opposing pressures of said spring and the pressure of fluid supplied to said application chamber and operative upon an increase in pressure in said chamber exceeding the pressure of said spring to open said communication, said brake valve device having a new passage and being operative in first service position to supply fluid under pressure to said new passage and in service position to vent fluid under pressure from said new passage, a movable abutment controlling the pressure of said spring and operative upon the venting of fluid pressure from a chamber to provide one degree of spring pressure and upon the supply of fluid under pressure to said chamber to increase the pressure of said spring, the last named chamber being connected to said new passage in said brake valve device.

14. A modified No. 6-ET locomotive brake equipment comprising an engineer's automatic brake valve device having the usual running, lap, and service positions for controlling the pressure of fluid in said brake pipe and having the usual holding position converted to a first service position for also effecting a reduction in pressure in said brake pipe, reduction limiting means associated with said brake valve device and operative in the first service position thereof for limiting the reduction in pressure in said brake pipe in said position, a distributing valve device operable upon a reduction in brake pipe pressure to effect an application of locomotive brakes, a spring, a delay valve device associated with said distributing valve device operative to delay the application of locomotive brakes upon operation of said distributing valve device, said brake valve device having a new passage and being arranged to effect different variations in pressure in said new passage in said first service position and in said service position, and means associated with said delay valve device controlled by the pressure variations in said new passage and operative in the first service position of said brake valve device for actuating said delay valve device to prevent an application of locomotive brakes upon operation of said distributing valve device and providing for the operation of said delay valve device in the service position of said brake valve device.

15. In a fluid pressure brake, in combination, a valve device having a passage to which fluid under pressure is adapted to be supplied and having a chamber adapted to receive fluid under pressure from said passage, an increase in pressure in said chamber being adapted to effect an application of brakes to a degree dependent upon the pressure of fluid in said chamber, a spring, valve means controlling communication between said passage and chamber and controlled by the pressure of fluid in said passage and the opposing pressures of fluid in said chamber and of said spring and being operative upon an increase in pressure in said passage to a degree sufficient to overcome the pressure of said spring to supply fluid under pressure from said passage to said chamber in accordance with the increase in pressure in said passage, means for reducing the pressure of said spring in accordance with the increase in fluid pressure in said chamber, and means for adjusting the pressure of said spring to provide different spring pressures for controlling the operation of said valve means.

16. In a fluid pressure brake, in combination, a valve device having a passage to which fluid under pressure is adapted to be supplied and having a chamber adapted to receive fluid under pressure from said passage, an increase in pressure in said chamber being adapted to effect an application of brakes to a degree dependent upon the pressure of fluid in said chamber, a spring, valve means controlling communication between said passage and chamber and controlled by the pressure of fluid in said passage and the opposing pressures of fluid in said chamber and of said spring and being operative upon an increase in pressure in said passage to a degree sufficient to overcome the pressure of said spring to supply fluid under pressure from said passage to said chamber in accordance with the increase in pressure in said passage, means for reducing the pressure of said spring in accordance with the increase in pressure in said chamber, a fluid pressure controlled movable abutment for controlling the pressure of said spring which opposes operation of said valve means by fluid pressure supplied to said passage, said movable abutment being operative when the pressure of fluid acting thereon is of one degree to provide a certain pressure of said spring and when of a greater degree to provide a different pressure of said spring, and means for varying the pressure of fluid on said abutment.

17. In a fluid pressure brake, in combination, a valve device having a passage to which fluid under pressure is adapted to be supplied and having a chamber adapted to receive fluid under pressure from said passage, an increase in pressure in said chamber being adapted to effect an application of brakes to a degree dependent upon the pressure of fluid in said chamber, a spring, valve means controlling communication between said passage and chamber and controlled by the pressure of fluid in said passage and the opposing pressure of said spring and being operative upon an increase in pressure in said passage sufficient to overcome the pressure of said spring to open communication between said passage and chamber, and means operative to adjust the pressure of said spring to provide different pressures of said spring on said valve means to control the operation thereof.

18. In a locomotive fluid pressure brake equipment, in combination, a brake pipe, a distributing valve device operative upon a reduction in pressure in said brake pipe to supply fluid under pressure to a passage and operative upon a reduction in brake pipe pressure to release fluid under pressure from said passage, said device having an application cylinder, an increase in pressure in which is adapted to effect an application of locomotive brakes and a reduction in pressure in which is adapted to effect a release of locomotive brakes, delay valve means associated with said device and comprising a spring, and valve means controlling communication between said passage and cylinder and controlled by the pressure of fluid in said passage and the opposing pressure of said spring, said spring being operative to actuate said valve means to close communication between said passage and cylinder when the pressure of said spring exceeds the opposing pressure of fluid in said passage, and said valve means being operative upon an increase in pressure in said passage sufficient to overcome the opposing pressure of said spring to open communication between said passage and cylinder, and an application cylinder pipe connected directly to said application cylinder for controlling the pressure of fluid therein independently of said valve means.

19. In a locomotive brake equipment, in combination, a brake pipe, a distributing valve device of a No. 6–ET locomotive brake equipment having an application portion operative upon a supply of fluid under pressure to an application cylinder for effecting an application of locomotive brakes, said distributing valve device having an equalizing portion operative upon a reduction in brake pipe pressure for supplying fluid under pressure to an application chamber for supply to said application cylinder, a spring, and delay valve means controlling communication between said application chamber and application cylinder controlled by the pressure of fluid in said application chamber and the opposing pressures of fluid in said application cylinder and said spring, said delay valve means being operative upon an increase in pressure in said chamber sufficient to overcome the pressure of said spring to supply fluid under pressure from said chamber to said cylinder in accordance with the increase in pressure in said chamber, and means operative by the pressure of fluid in said cylinder to reduce the pressure of said spring opposing operation of said valve means in accordance with the increase in pressure in said cylinder.

20. In a locomotive brake equipment, in combination, a brake pipe, a distributing valve device of a No. 6–ET locomotive brake equipment having an application portion operative upon a supply of fluid under pressure to an application cylinder for effecting an application of locomotive brakes, said distributing valve device having an equalizing portion operative upon a reduction in brake pipe pressure for supplying fluid under pressure to an application chamber for supply to said application cylinder, a spring, and delay valve means controlling communication between said application chamber and application cylinder controlled by the pressure of fluid in said application chamber and the opposing pressures of fluid in said application cylinder and said spring, said delay valve means being operative upon an increase in pressure in said chamber sufficient to overcome the pressure of said spring to supply fluid under pressure from said chamber to said cylinder in accordance with the increase in pressure in said chamber, and means operative by the pressure of fluid in said cylinder to reduce the pressure of said spring opposing operation of said valve means in accordance with the increase in pressure in said cylinder, said delay valve device comprising a casing removably secured to said application portion over said cylinder and constituting a cover therefor.

21. In a locomotive brake equipment, in combination, a brake pipe, a distributing valve device of a No. 6–ET locomotive brake equipment having an application portion operative upon a supply of fluid under pressure to an application cylinder for effecting an application of locomotive brakes, said distributing valve device having an equalizing portion operative upon a reduction in brake pipe pressure for supplying fluid under pressure to an application chamber for supply to said application cylinder, and delay valve means for controlling communication between said chamber and cylinder comprising a casing, a valve in said casing controlling communication between said chamber and cylinder, a spring, a movable abutment subject to the opposing pressures of said spring and cylinder and connected to said valve for rendering said spring operable to bias said valve to a position for closing said communication, a second movable abutment of greater area than the first named abutment subject to the opposing pressures of said chamber and cylinder and also connected to said valve, said valve being operative by the second named abutment upon an increase in pressure in said chamber exceeding the opposing pressure of said spring to actuate said valve to supply fluid from said chamber to said cylinder in accordance with the increase in pressure in said chamber, the pressure of fluid in said cylinder acting on the first named abutment being operative to reduce the effectiveness of said spring to oppose operation of said valve in accordance with the increase in pressure in said cylinder.

22. In a locomotive brake equipment, in combination, a brake pipe, a distributing valve device of a No. 6–ET locomotive brake equipment having an application portion operative upon a supply of fluid under pressure to an application cylinder for effecting an application of locomotive brakes, said distributing valve device having an equalizing portion operative upon a reduction in brake pipe pressure for supplying fluid under pressure to an application chamber for supply to said application cylinder, and delay valve means for controlling communication between said chamber and cylinder comprising a casing, a valve in said casing controlling communication between said chamber and cylinder, a spring, a movable abutment subject to the opposing pressures of said spring and cylinder and connected to said valve for rendering said spring operable to bias said valve to a position for closing said communication, a second movable abutment of greater area than the first named abutment subject to the opposing pressures of said chamber and cylinder and also connected to said valve, said valve being operative by the second named abutment upon an increase in pressure in said chamber exceeding the opposing pressure of said spring to actuate said valve to supply fluid from said chamber to said cylinder in accordance with the increase in pressure in said chamber, the pressure of fluid in said cylinder acting on the first named abutment being operative to reduce the effectiveness of said spring to oppose operation of said valve in accordance with the increase in pressure in said cylinder, another movable abutment operative to vary the pressure of said spring on the first named movable abutment, and an engineer's brake valve device having two service positions for venting fluid under pressure from said brake pipe and operative in one of said positions to supply fluid under pressure for acting on the last named abutment for increasing the pressure of said spring to a desired degree and in the other service position for venting fluid under pressure from said last named abutment to reduce the pressure of said spring to a desired degree.

23. In a fluid pressure brake, in combination, a valve device having a passage to which fluid under pressure is adapted to be supplied and having a chamber adapted to receive fluid under pressure from said passage, an increase in pressure in said chamber being adapted to effect an application of brakes to a degree dependent upon the pressure of fluid in said chamber, valve means controlling communication between said passage and chamber and between said chamber and atmosphere, a spring, a movable abutment for controlling said valve means controlled by the opposing pressures of said spring and the pressure of fluid in said passage and operative upon an increase in pressure in said passage to a degree sufficient to overcome the pressure of said spring to actuate said valve means to close communication between said chamber and atmosphere and to open communication between said chamber and passage, said spring being operative when the pressure in said passage is of a lower degree to actuate said valve means to connect said chamber to atmosphere and to close communication between said chamber and passage.

24. In a fluid pressure brake, in combination, a valve device having a passage to which fluid under pressure is adapted to be supplied and having a chamber adapted to receive fluid under pressure from said passage, an increase in pressure in said chamber being adapted to effect an application of brakes to a degree dependent upon the pressure of fluid in said chamber, valve means controlling communication between said passage and chamber and between said chamber and atmosphere, and means for operating said valve means to vary the pressure of fluids in said chamber in accordance with the pressure of fluid in said passage comprising a spring, a movable abutment operatively connected to said valve means and controlled by the opposing pressures of said spring and the pressure of fluid in said chamber, and another movable abutment subject to the opposing pressure of fluid in said chamber and passage and operatively connected to said valve means in such a manner that the pressure in said passage acting thereon opposes the pressure of said spring on the first named abutment.

ELLIS E. HEWITT.